United States Patent [19]

Spykerman

[11] Patent Number: 4,679,843
[45] Date of Patent: Jul. 14, 1987

[54] VISOR MOUNTING CLIP

[75] Inventor: Scott A. Spykerman, Holland, Mich.

[73] Assignee: Prince Corporation, Holland, Mich.

[21] Appl. No.: 686,158

[22] Filed: Dec. 26, 1984

[51] Int. Cl.⁴ .............................................. B60J 3/02
[52] U.S. Cl. ................................ 296/97 K; 296/97 H; 296/97 R
[58] Field of Search ................ 296/97 R, 97 H, 97 J, 296/97 K, 97 D, 97 F, 97 G, 97 B

[56] References Cited

U.S. PATENT DOCUMENTS

| | | | |
|---|---|---|---|
| 3,429,610 | 2/1969 | Bornefeld | 296/97 R |
| 3,827,748 | 8/1974 | Herr et al. | 296/97 H |
| 4,000,404 | 12/1976 | Marcus | 296/97 H X |
| 4,163,579 | 8/1979 | Mahler et al. | 296/97 H |
| 4,174,864 | 11/1979 | Viertel et al. | 296/97 H |
| 4,272,118 | 6/1981 | Viertel et al. | 296/97 R |
| 4,352,518 | 10/1982 | Prince et al. | 296/97 H |
| 4,353,591 | 10/1982 | Cziptschirsch | 296/97 H |
| 4,378,129 | 3/1983 | Kaiser et al. | 296/97 H |
| 4,384,740 | 5/1983 | Marrotta | 296/97 H |
| 4,435,009 | 3/1984 | Foggini | 296/97 H |

FOREIGN PATENT DOCUMENTS

| | | | |
|---|---|---|---|
| 1259725 | 1/1968 | Fed. Rep. of Germany | 296/97 K |
| 3235997 | 3/1984 | Fed. Rep. of Germany | 296/97 K |
| 3323735 | 1/1985 | Fed. Rep. of Germany | 296/97 C |
| 1396360 | 3/1965 | France | 296/97 K |
| 1043087 | 9/1966 | United Kingdom | 296/97 H |

Primary Examiner—Robert B. Reeves
Assistant Examiner—Russell D. Stormer
Attorney, Agent, or Firm—Price, Heneveld, Cooper, DeWitt & Litton

[57] ABSTRACT

A visor includes a polymeric core divided in halves in a clamshell-type configuration in which adjacent the hinged junction of each half there is provided a slot extending inwardly from an edge of the core to define a clip recess. The core includes an aperture extending inwardly from one end of the core and spanning across opposite sides of the edges of the clip recess for receiving and holding a pin inserted from an end of the core. The pin is inserted while a cylindrical roller sleeve is positioned in the recess to hold the sleeve in the recess.

5 Claims, 6 Drawing Figures

U.S. Patent    Jul. 14, 1987    4,679,843
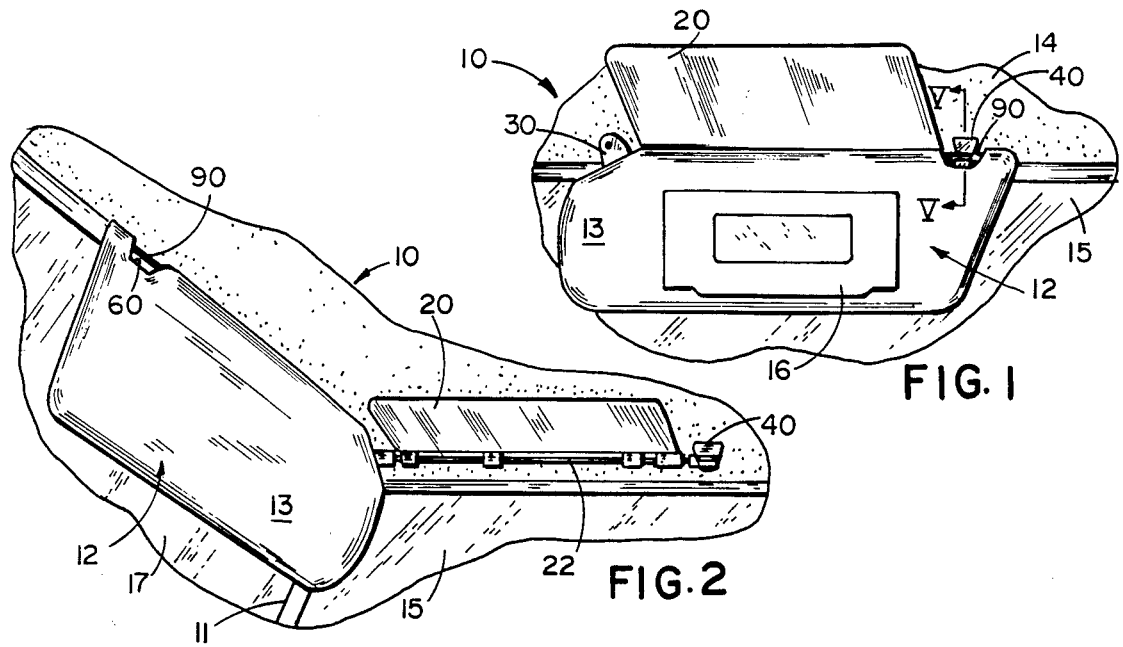
FIG. 1
FIG. 2
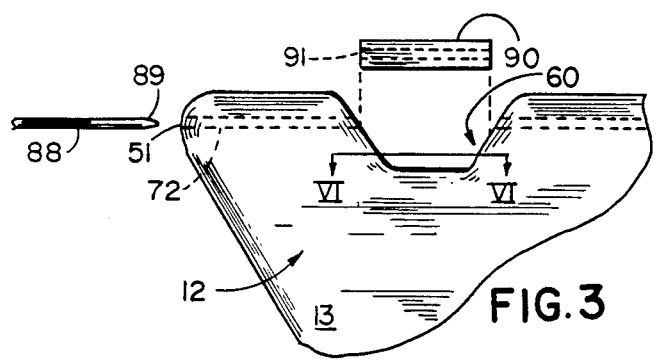
FIG. 3
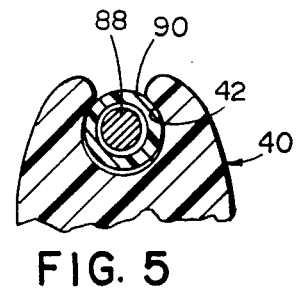
FIG. 5
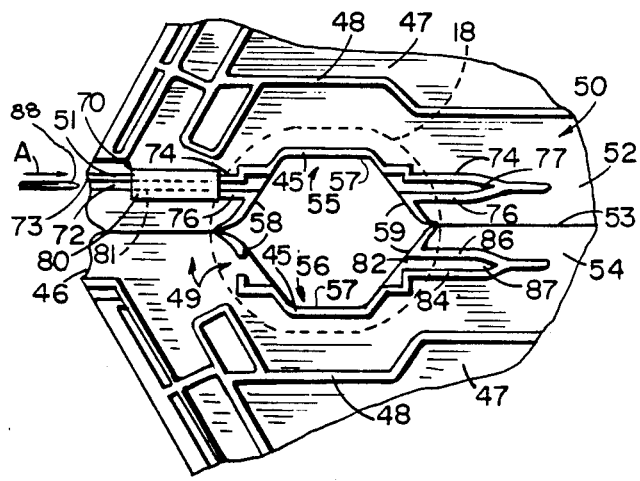
FIG. 4
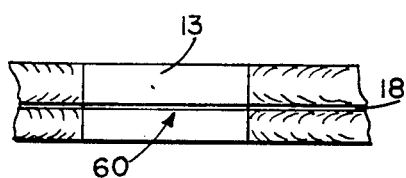
FIG. 6

VISOR MOUNTING CLIP

BACKGROUND OF THE INVENTION

The present invention pertains to vehicle visors and particularly to a mounting clip assembly for removably securing one end of a visor to the vehicle.

Conventional visors for vehicles, such as automobiles, are permanently attached to the vehicle at one end by a pivot mounting post to permit the visor to be raised and lowered and also moved from the windshield to a side window. Typically, a mounting post extends from the opposite or free end of the visor and can be removably secured in a socket mounted to or near the center of the upper windshield area of the vehicle such that the visor can be removably secured for movement from the front windshield area to the side window area of the vehicle and yet, when in a windshield location, securely held by both the pivot mounting post and the end post and cradle. In recent years, with more compact vehicles, visor designs have incorporated mounting clips which are incorporated within the body of the visor near the free end and extending across the edges of the recess. U.S. Pat. No. 3,429,610 shows one example of such a visor construction.

Some visors are manufactured with a wire frame which extends around the peripheral edge of the visor, the body of which is made of a foam material. In such construction, the upper frame member extends across the top edge of a clip receiving recess and is covered by a roller sleeve. The roller sleeve in turn engages the clip holding cradle. One visor in which a core member is employed is disclosed in U.S. patent application Ser. No. 490,363 entitled VISOR COVERING, filed on May 2, 1983, and employs an integral clip assembly insert which is directly mounted to the polypropylene visor core. Other visors employ a plastic rod extending across a recess in the upper edge of the visor body and is force fitted into the visor pivot rod hinge extending along the edge of the visor. A separate trim piece of molding covers the peripheral edge of the recess.

Thus, there exists a variety of visor mounting clips which are set-in from the end of the visor body opposite the pivot mounting bracket.

SUMMARY OF THE PRESENT INVENTION

The structure of the present invention represents an improvement over the prior structure by providing a visor mounting clip which allows a clamshell-type upholstery method to be employed to provide a clean appearing, nonbordered recess for the clip and also provides a clip which is relatively inexpensive to assemble and provides a roller interconnection beween the visor and the support socket mounted to the vehicle.

Visors embodying the preferred embodiment of the present invention include a polymeric visor core divided in halves in a clamshell-type configuration in which adjacent the hinged junction of each half there is provided a slot extending inwardly from an edge of the core to define a clip recess. The core includes pin guide and support means extending inwardly from one end of the core and spanning across opposite sides of the edges of the clip recess. The guide and support means are adapted to receive and hold a pin inserted from an end of the core. The pin is inserted while a cylindrical roller sleeve is positioned in alignment with opposing, facing ends of the channel means and is supported in concentric relationship by the pin to complete the clip assembly.

Visors embodying the present invention thus include a polymeric core having an insertable pin mounted thereto for supporting a roller sleeve within a clip defining recess. In the preferred embodiment of the invention, the visor is an upholstered visor with upholstery material surrounding the core and tucked between peripheral edges of each core half to provide a borderless periphery to the visor body including the clip defining recess. The resultant structure is economical to manufacture and provides a roller connection between the end of the visor and the supporting socket therefor to permit the visor to be moved between stored and use positions without pulling from the stationary socket.

These and other features, objects and advantages of the present invention will best be understood by reference to the following description thereof together with the accompanying drawings in which:

BRIEF DESCRIPTION OF THE DRAWINGS

FIG. 1 is a perspective view of a visor system embodying the present invention;

FIG. 2 is a perspective view of the structure shown in FIG. 1 with the primary visor moved to a side window position in a vehicle;

FIG. 3 is a fragmentary, enlarged, front elevational view in exploded form of the visor mounting clip of the present invention;

FIG. 4 is a fragmentary, plan view of the visor core halves defining the visor body with the core halves shown in an open position;

FIG. 5 is an enlarged, fragmentary, cross-sectional view of the visor mounting clip and socket shown in FIG. 1 and taken along section line V—V of FIG. 1; and FIG. 6 is an enlarged fragmentary view of a portion of the clip recess shown in FIG. 3 as viewed in a direction shown by arrows VI—VI in FIG. 3.

DETAILED DESCRIPTION OF THE PREFERRED EMBODIMENT

Referring initially to FIGS. 1 and 2, there is shown a visor system 10 incorporating the present invention. The visor system comprises a first or primary visor 12 and a second or auxiliary visor panel 20. Both visor 12 and panel 20 are coupled between a first mounting bracket 30 and a second mounting bracket 40, with the brackets being mounted in spaced relationship to the roof 14 of a vehicle above its windshield 15 in a conventional manner. It is to be understood that the term "roof" as used herein includes conventional sheet metal beams or other support structure between the outer sheet metal skin of the vehicle and a fabric headliner covering the various roof elements. In the embodiment shown, a driver's side visor system 10 is shown and is mounted to the right of the "A" pillar 11 of the vehicle which extends between the windshield 15 and side window 17. As seen in FIG. 1, visor 12 has been moved from a stored position adjacent the roof 14 to a lowered, use position for blocking incident sunlight or for use of an illuminated vanity mirror insert 16 installed within the visor body and which can be of the type disclosed in U.S. Pat. No. 4,227,241. In FIG. 1, the auxiliary visor panel 20 is shown in a raised, stored position.

Visor 12 can be moved to a side window position, as shown in FIG. 2, and the auxiliary visor panel 20 lowered and moved along an auxiliary supporting rod 22 extending between brackets 30 and 40 such that simultaneous windshield and side window coverage is available with the visor system 10. The visor system mounting brackets 30, 40 and auxiliary visor construction 20 is disclosed in greater detail in co-pending U.S. patent application Ser. No. 667,765, entitled VISOR SYSTEM, filed on Nov. 2, 1984, the disclosure of which is incorporated herein by reference. The present invention pertains to the improved clip assembly whereby visor 12 can be removably secured to mounting bracket 40, now described in detail in conjunction with FIGS. 3-5.

Visor 12 includes an internal polymeric core 50 (FIG. 4) which, in the preferred embodiment, includes core halves 52 and 54 integrally joined along a thin living hinge section 53. Core 50 is made of a polymeric material such as polypropylene with the core halves being folded together along hinge 53 to define the general visor body shape. The visor is covered by a suitable upholstery such as fabric 13 to conform the visor appearance to that of the interior of the vehicle. The fabric 13 is tucked around the peripheral edges of core halves 52 and 54 and glued and clamped in place. The general visor core construction and method of upholstery is described in greater detail in co-pending U.S. patent application Ser. No. 490,363, entitled VISOR COVERING, filed on May 2, 1983, and now allowed, the disclosure of which is incorporated herein by reference.

Core 50 includes three-sided recesses 55 and 56 (FIG. 4) formed through the hinge 53 in each half 52 and 54, respectively, of the visor core. Each of the recesses includes a central edge 57 extending generally parallel to and spaced from hinge 53 and outwardly extending (toward hinge 53) edges 58 and 59 to define, when the visor is assembled, a tapered recess 60 (FIG. 3) having inwardly tapered edges defined by edges 58 and 59 of the core. Surrounding edges 57-59 of recess 60 are raised walls 45 with flat tops which are integrally molded as a part of the core. An edge 18 (shown in phantom form in FIG. 4) of fabric 13 is wrapped around the edges 57-59 of the recess 60 and glued to the walls 45 such that when the visor core halves are fused together, the recess has a neat appearing borderless look, as shown in FIGS. 1-3 and 6.

Core 50 includes pin guide and support means 70 which defines an aperture or channel 72 opening at the upper corner 51 of the visor and which extends in parallel spaced relationship to hinge 53. Means 70 also extends across recess 60 and is thus bisected by the recess. In the preferred embodiment of the invention, means 70 comprises a first channel 72 defined by integrally molded, spaced, parallel ribs 74 and 76 extending inwardly from the outer, upper edge 51 of core half 52. Channel 72 spans edges 58 and 59 of recess 55 and terminates in a tapered end segment 77. Intermediate end 51 and edge 58, there is provided a collar 80 having an aperture 81 extending therethrough and aligned axially with the channel 72 defined by spaced ribs 74 and 76.

In the preferred embodiment of the pin guide and support means, illustrated, a second channel 82 is provided in core half 54 and is defined by integral spaced ribs 84 and 86 extending in spaced parallel relationship from edge 59 of recess 56 and terminating at tapered end 87. Channel 82 and the end segment 87 are spaced from hinge 53 the same distance as channel 72. When the visor 12 is manufactured, core halves 52 and 54 are folded together such that portions 72 and 82 of the channel means, extending toward the center of the visor from edges 59, align and mate to circumscribe and hold a solid steel pin 88 having a tapered end 89 which engages tapered ends 77 and 87 of the guide and support means of the channel.

The core 50 includes a plurality of reinforcing ribs 48 arranged in a geometric pattern to provide reinforcement between the outer walls 47 of each of the core halves and also defines fusion surfaces which align and mate for securing the core halves together during manufacturing of the visor. The end 51 of visor core half 54 is open, as indicated at area 49, to permit collar 81 to extend within that area and also includes an arcuate opening 46 providing clearance for the left end of spaced ribs 74 and 76. The upholstery material 13 of the visor is wrapped around the edges 57, 58 and 59 of recesses 55 and 56 and glued to walls 45 and also around the peripheral edges of the visor. The raised ribs 48 are heated such that when halves 52 and 54 are closed, the core halves cool and fuse together.

Pin 88 is inserted into the open end 73 of channel means 72 from end 51 of the visor, as illustrated in the exploded view of FIG. 3, while a roller sleeve 90 comprising a polymeric cylindrical member having a longitudinally extending aperture 91 therein is held within notch 60 to align with the channel segments to the left and right of notch 60. This process is performed after the upholstery step with the tapered end 89 of rod 88 puncturing the upholstery as necessary as it extends across recess 60. By providing outwardly tapered edges to recess 60, clearance for roller sleeve 90 for assembly is provided and a larger aperture presented for attaching visor 12 to bracket 40. Pin 88, which has a length conforming to that of the guide and support means 80, is inserted mechanically into the channel and captures and holds the roller sleeve 90 in place. The outer diameter of pin 88 is slightly greater than that of the inner diameter of channel means 72 and 82 and collar 80 such that the pin fits snugly and is held within the channel. The inner diameter of aperture 91 of sleeve 90, however, is slightly greater than the outer diameter of pin 88 such that the sleeve is free to rotate about pin 88. In the preferred embodiment, pin 88 has an overall length of three inches and a diameter of 3/32 inch.

When the visor is in the position illustrated in FIG. 1, sleeve 90 is captively held within the resilient polymeric socket 42 of bracket 40, as best seen in FIG. 5, and the visor can be pivoted about pivot bracket 30 and bracket 40 with sleeve 90 remaining stationary within socket 42, while pin 88 rotates with the visor and within sleeve 90. Thus, by providing sleeve 90, concentric with pin 88, when the visor is moved between a raised, stored position against the roof 14 and the lowered, use position, as illustrated in FIG. 1, the mounting clip defined by the captive pin 88 and sleeve 90 does not tend to rotate out of socket 42 which can occur if the sleeve is not permitted to rotate with respect to the visor.

The upholstery around notch 60, in which the fabric is tucked around edges 57, 58 and 59 and glued to the ridges defining these edges, provides a clean appearing visor clip assembly without the need for additional trim bezzles. Further, the system of the present invention, by providing the channel defined by the visor body and specifically the core halves, provides an inexpensive and easy to manufacture system for providing a roller sleeve 90 for use in conjunction with a visor mounting socket such as the resilient socket 42 provided by bracket 40. The curvilinear arms defining socket 42 are sufficiently resilient to allow the sleeve to be withdrawn therefrom for movement of the visor to the position as shown in FIG. 2.

It will become apparent to those skilled in the art that the various modifications to the preferred embodiments of the invention can be made without departing from the spirit or scope thereof as defined by the appended claims.

The embodiments of the invention in which an exclusive property or privilege is claimed are defined as follows.

1. A visor having a mounting clip assembly for one end of the visor for detachably securing said one end to a linearly extending, cylindrical socket mounted to a vehicle, said visor formed of at least one core means constructed of plastic material comprising:

said visor core means including a pin guide and support channel, said channel formed by parallel ribs extending inwardly from one end of said core corresponding to said one end of said visor, said channel having an opening at one edge of said visor for receiving a pin therein, said ribs forming said channel extending adjacent and parallel to a longitudinal edge of said visor, said core including a recess formed therein and extending from said longitudinal edge of said visor in orthogonal relationship to and intersecting said channel;

a collar means positioned within said channel adjacent said opening;

cylindrical solid pin means extending within said channel through said collar means and between said ribs, said ribs being tapered at the innermost ends of said channel remote from said opening, whereby said pin means is wedged into said collar means and tapered ends of said ribs which secure said pin means in place against rotation or other movement in said channel; and a cylindrical sleeve coaxially surrounding said pin in the area extending substantially entirely across said recess, said sleeve having an inner diameter greater than the outer diameter of said pin to permit rotation of said sleeve around said pin with said pin extending through the entire length of said sleeve.

2. The visor as defined in claim 1 wherein said visor core means includes a pair of polymeric core halves joined together along a polymeric hinge and said visor includes an upholstery cover having a portion extending around the edge of said recess between said core halves.

3. A method of manufacturing a visor mounting clip to a visor body including a pin receiving aperture extending across a roller sleeve receiving recess and communicating with one end of said visor body, comprising the steps of:

positioning a roller sleeve within the visor recess in alignment with the pin receiving aperture; and driving a pin into said aperture from said one end of said visor body to extend through said sleeve and across said recess for holding said sleeve in position with respect to said visor body.

4. The method as defined in claim 3 wherein said recess is upholstered by the steps of:

forming said recess in a pair of core halves;

wrapping an upholstery material around edges of said recess formed in each core half;

bonding the edge of the upholstery to facing edges of each core half; and bonding said core halves together.

5. The method as defined in claim 4 wherein said forming, wrapping and bonding steps are performed prior to said positioning and driving steps.

* * * * *